United States Patent
Wang et al.

(10) Patent No.: US 9,136,964 B2
(45) Date of Patent: Sep. 15, 2015

(54) VIEWING IMPRESSION REPORT COLLECTION, STORAGE, AND REPORTBACK OF INSERTED CONTENT WITH DVR PLAYBACK

(75) Inventors: Yeqing Wang, Horsham, PA (US); John A. Schlack, Quakertown, PA (US); Scott D. Sellers, Quakertown, PA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 512 days.

(21) Appl. No.: 12/822,771

(22) Filed: Jun. 24, 2010

(65) Prior Publication Data

US 2011/0321077 A1 Dec. 29, 2011

(51) Int. Cl.
| | |
|---|---|
| H04N 7/16 | (2011.01) |
| H04H 60/37 | (2008.01) |
| H04H 20/82 | (2008.01) |
| H04H 60/27 | (2008.01) |
| H04H 60/31 | (2008.01) |
| H04N 21/258 | (2011.01) |
| H04N 21/442 | (2011.01) |
| H04N 21/658 | (2011.01) |
| H04H 20/78 | (2008.01) |

(52) U.S. Cl.
CPC .............. *H04H 60/37* (2013.01); *H04H 20/82* (2013.01); *H04H 60/27* (2013.01); *H04H 60/31* (2013.01); *H04N 21/25866* (2013.01); *H04N 21/44222* (2013.01); *H04N 21/6582* (2013.01); *H04H 20/78* (2013.01)

(58) Field of Classification Search
CPC .................... H04N 21/6582; H04N 21/44222; H04N 21/25866; H04H 20/82; H04H 60/27; H04H 60/37; H04H 60/31

USPC ............ 725/14, 22, 23, 42, 46, 100, 110, 139
See application file for complete search history.

(56) References Cited

U.S. PATENT DOCUMENTS

| | | | |
|---|---|---|---|
| 5,801,747 A * | 9/1998 | Bedard ........................... | 725/46 |
| 7,440,674 B2 | 10/2008 | Plotnick et al. | |
| 7,444,655 B2 | 10/2008 | Sardera | |
| 7,634,785 B2 | 12/2009 | Smith | |
| 2002/0062481 A1 * | 5/2002 | Slaney et al. ................... | 725/42 |
| 2002/0152460 A1 | 10/2002 | Soloff | |
| 2004/0045020 A1 * | 3/2004 | Witt et al. ....................... | 725/13 |

(Continued)

OTHER PUBLICATIONS

PCT Search Report & Written Opinion, Re: Application #PCT/US2011/038773; Aug. 25, 2011.

*Primary Examiner* — Brian T Pendleton
*Assistant Examiner* — Alan Luong
(74) *Attorney, Agent, or Firm* — Fish & Richardson P.C.

(57) ABSTRACT

A method and system that computes viewing statistics for a digital video content stream received at a set-top box. The digital video content stream includes a first segment of video content, a second segment of video content, a third segment of video content, a first timing mark that indicates a transition from the first segment to the second segment, and a second timing mark that indicates a transition from the second segment to the third segment. The method initiates a transmission of the digital video content stream at the set-top box, monitors the transmission of the digital video content stream relative to the first timing mark and the second timing mark, and computes view data for the second segment based on the monitoring of the transmission. The method stores the view data at the set-top box.

17 Claims, 2 Drawing Sheets

(56) References Cited

U.S. PATENT DOCUMENTS

| | | | |
|---|---|---|---|
| 2004/0221311 A1* | 11/2004 | Dow et al. | 725/52 |
| 2004/0230994 A1* | 11/2004 | Urdang et al. | 725/88 |
| 2005/0086119 A1* | 4/2005 | Komuro et al. | 705/26 |
| 2008/0092159 A1 | 4/2008 | Dmitriev et al. | |
| 2011/0029393 A1* | 2/2011 | Apprendi et al. | 705/14.73 |
| 2012/0304211 A1* | 11/2012 | Berezowski et al. | 725/14 |

* cited by examiner

VIEWING IMPRESSION REPORT COLLECTION, STORAGE, AND REPORTBACK OF INSERTED CONTENT WITH DVR PLAYBACK

RELATED APPLICATION

This application for letters patent relates to U.S. patent application Ser. No. 12/486,214, titled "INSERTION OF RECORDED SECONDARY DIGITAL VIDEO CONTENT DURING PLAYBACK OF PRIMARY DIGITAL VIDEO CONTENT", and filed on Jun. 17, 2009; the disclosure of which this application hereby incorporates by reference.

BACKGROUND

A set-top box is a computing device that connects a television, or display device, to an external digital signal source. The set-top box converts the digital signal into video content for display on the television. It has become increasingly popular and common for cable, satellite, and traditional broadcast service providers to incorporate a digital video recorder (DVR) with the set-top box. The DVR encodes the video content that the set-top box receives into a digital format, such as MPEG-1 or MPEG-2, and stores the video content on a hard drive for later playback. The DVR and set-top box allow the viewer to pause the video content during a live television program, rewind the video content during a live television program, and record video content associated with a television program for later viewing.

In one embodiment, the video content that the DVR records may include advertisements inserted between program segments. Typically, this video content is scheduled network programming that includes preselected advertisements broadcast at specified time slots in the video content. When the DVR records this type of video content, the recorded content includes the program segments in addition to the original advertisements broadcast with the program segments. Thus, the playback of the recorded content includes the program segments and the original advertisements.

In another embodiment, the video content that the DVR records may include pre-positioned targeted advertisements during the presentation of recorded or live programming material. Targeted advertising is a feature that results in a transition to an advertisement other than the default broadcast advertisement. Pre-positioned advertisements are those advertisements that are downloaded or recorded at the DVR set-top box system (e.g., on a hard disk or other local storage device) in advance, with the intent of being used to replace or augment advertising already present in existing (recorded) or anticipated (network delivered) entertainment program material.

Currently, when a viewer selects for playback video content stored on the DVR, the DVR or set-top box does not collect viewing statistics during the playback of the video content. When the video content includes advertisements such as preselected broadcast advertisements and pre-positioned targeted advertisements, the viewing statistics are important for advertisers and other interested third parties. Thus, there is a demand for a method and system for collecting, storing, and reporting viewing statistics during playback of video content. The presently disclosed invention satisfies this demand.

SUMMARY

Aspects of the present invention provide a method and system that computes viewing statistics for a digital video content stream received at a set-top box. The digital video content stream includes a first segment of video content, a second segment of video content, a third segment of video content, a first timing mark that indicates a transition from the first segment to the second segment, and a second timing mark that indicates a transition from the second segment to the third segment. The method initiates a transmission of the digital video content stream at the set-top box, monitors the transmission of the digital video content stream relative to the first timing mark and the second timing mark, and computes view data for the second segment based on the monitoring of the transmission. The method stores the view data at the set-top box.

DETAILED DESCRIPTION

Figure 1:
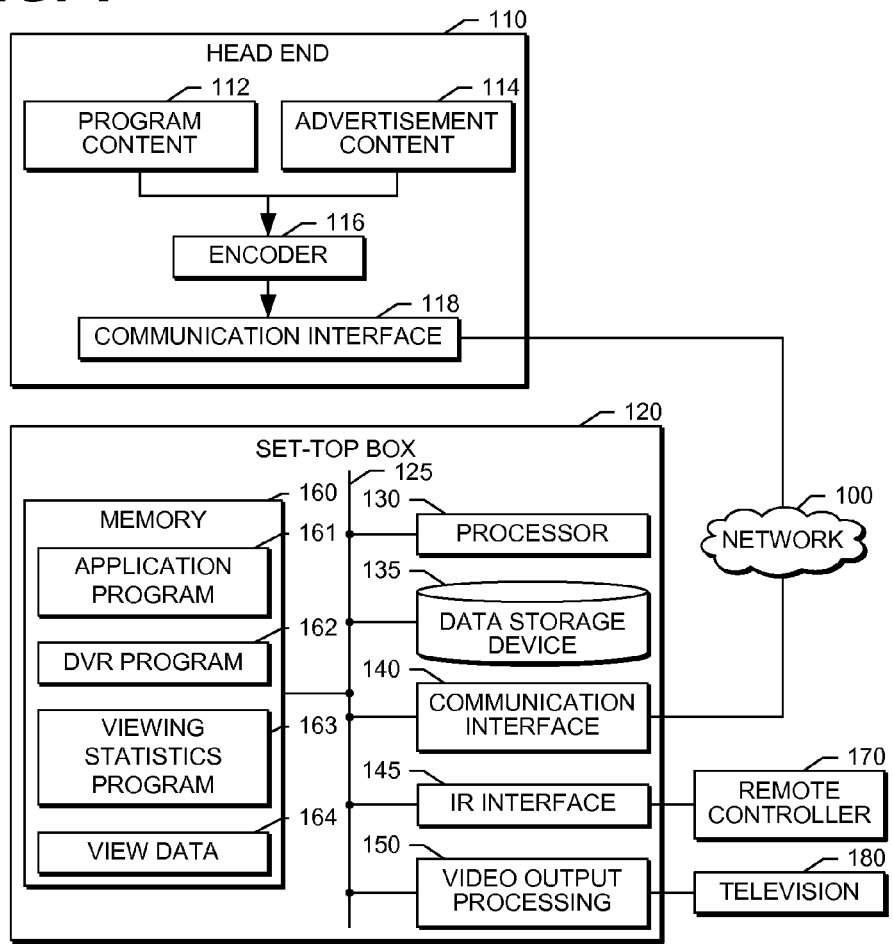
FIG. 1 is a block diagram that illustrates one embodiment of the hardware components of a system that performs the present invention.

FIG. 1 is a block diagram that illustrates one embodiment of the hardware components of a system that performs the present invention. A network 100 connects a head end 110 facility to a set-top box 120. In various embodiments not shown in FIG. 1, the network 100 may include any number of interconnected Internet Protocol (IP) networks that each connects any number of head end 110 facilities and set-top boxes 120.

The head end 110 facility provides a connection to external services such as video servers, public switched telephone network voice, multimedia messages, internet data, and the like. In one embodiment, the head end 110 facility is a cable television master head end facility for receiving television signals for processing and distribution over a cable television system. The head end 110 facility includes an encoder 116 that retrieves program content 112 and advertisement content 114, either from a "live" feed, or a data storage device, and produces a digital video signal that the communication interface 118 transmits to the set-top box 120 via the network 100.

The set-top box 120 is a computing device that receives a digital video signal from the head end 110 facility via the network 100, produces a digital video content stream for display on a television 180, and receives input from a user via a remote controller 170 or keypad (not shown). The set-top box 120 is typically located in the premises, such as a home, of a user or customer who is a cable subscriber.

The network 100, in one embodiment, is a public communication network or wide area network (WAN) that connects the head end 110 facility and the set-top box 120. The present invention also contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA), Code Division Multiple Access (CDMA), or Orthogonal Frequency Division Multiplexing (OFDM) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

The set-top box 120, in one embodiment, is a general-purpose computing device that performs the present invention. A bus 125 is a communication medium that connects a processor 130, data storage device 135 (such as a Serial ATA (SATA) hard disk drive, optical drive, Small Computer System Interface (SCSI) disk, flash memory, or the like), communication interface 140, infrared (IR) interface 145, video output processing 150, and memory 160 (such as Random Access Memory (RAM), Dynamic RAM (DRAM), non-volatile computer memory, flash memory, or the like). The communication interface 140 connects the set-top box 120 to the network 100. The IR interface 145 connects the set-top box 120 to the remote controller 170. The video output processing 150 connects the set-top box 120 to the television 180, and sends the video content that the television 180 screen displays. In one embodiment, the implementation of the set-top box 120 is an application-specific integrated circuit (ASIC).

The processor 130 performs the disclosed methods by executing the sequences of operational instructions that comprise each computer program resident in, or operative on, the memory 160. The reader should understand that the memory 160 may include operating system, administrative, and database programs that support the programs disclosed in this application. In one embodiment, the configuration of the memory 160 of the set-top box 120 includes an application program 161, a digital video recorder (DVR) program 162, a viewing statistics program 163, and view data 164. The application program 161 is a conventional application program that the cable television operator installs in the set top box 120. The application program 161 provides the viewer with access to basic functions, such as the display of a video content stream on the television 180, and advanced functions, such as video-on-demand (VOD), interactive television, and other next-generation television application programs. The DVR program 162 is a conventional application program that encodes the video content that the set-top box receives into a digital format, and stores the video content on the data storage device 135 for later playback. The DVR program 162 also provides the viewer the ability to pause the video content during a live television program, rewind the video content during a live television program, and record video content associated with a television program for later viewing. The viewing statistics program 163 is a program that collects, computes, stores, and reports view data 164 during the playback of video content. The view data 164 may include the number of times the user watches an advertisement. If the user requests via the DVR program 162 to stop the video content during playback of an advertisement, the view data 164 may also include the portion or percentage of the advertisement that the user viewed before stopping the video content. If the user requests via the DVR program 162 to switch from normal play mode to a trick play mode during the playback of the advertisement, the view data 164 may also include which trick play operation the viewer selected and at which position in the video content the user selected the trick play operation. For example, selecting slow motion or rewind during the advertisement implies that the viewer is interested in the advertisement, while selecting fast forward implies that the viewer is disinterested in the advertisement. The application program 161, DVR program 162, viewing statistics program 163, and view data 164 perform the methods of the present invention disclosed in detail in FIG. 3. When the processor 130 performs the disclosed methods, it stores intermediate results in the memory 160 or data storage device 135. In another embodiment, the memory 160 may swap these programs, or portions thereof, in and out of the memory 160 as needed, and thus may include fewer than all of these programs at any one time.

Figure 2:
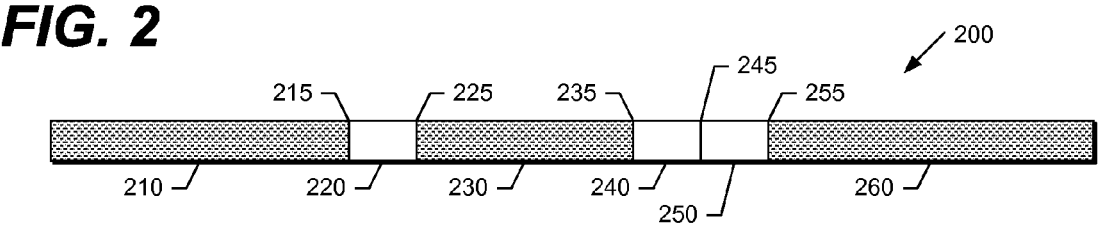
FIG. 2 is a block diagram that illustrates one embodiment of a digital video content stream that the set-top box 120 receives.

FIG. 2 is a block diagram that illustrates one embodiment of a digital video content stream that the set-top box 120 receives. In one embodiment, the segments comprising the digital video content stream 200 are associated with the same service. In another embodiment, the segments comprising the digital video content stream 200 represent a spliced stream of content associated with a number of different services.

A digital video content stream 200, as shown in FIG. 2, includes six segments, where each segment includes video content, and the organization of the segments is sequential and time-based. Thus, the end time for any segment occurs prior to the start time for the next segment in the sequence. As shown in FIG. 2, the first segment 210, third segment 230, and sixth segment 260 include program content 112 such as a movie, and the second segment 220, fourth segment 240, and fifth segment 250 include advertisement content 114 such a commercial advertisement. In one embodiment, the digital video content stream 200 is a real-time program stream provided by the head end 110 facility. In another embodiment, the digital video content stream 200 is a recorded program stream that a user recorded on the data storage device 135 and later requested for playback. In another embodiment, the advertisement content 114 in the digital video content stream 200 is the original advertisement content transmitted by the head end 110 facility. In another embodiment, the advertisement content 114 in the digital video content stream 200 is locally stored targeted advertisement content that the set-top box 120 inserts into the digital video content stream 200.

In one embodiment, the digital video stream 200 includes timing marks, splice out marks, or other content transition points indicated by any type of content change record (CCR), that indicate frame-accurate transition points between adjacent segments. Each timing mark, splice out mark, or CCR, indicates the beginning of a video segment, the end of a video segment, or a transition between two adjacent video segments. Typically, the head end 110 facility will mark its outgoing digital video program files with timing marks, splice out marks, or other content transition points indicated by any type of CCR. The set-top box 120 can detect and process the timing marks, splice out marks, or other content transition points indicated by any type of CCR, for the digital video program file. As shown in FIG. 2, the transition point 215 between the first segment 210 and the second segment 220 represents a timing mark, splice out mark, or CCR embedded or otherwise included in the digital video content stream 200. The transition point 225 between the second segment 220 and the third segment 230 represents a timing mark, splice out mark, or CCR embedded or otherwise included in the digital video content stream 200. The transition point 235 between the third segment 230 and the fourth segment 240 represents a timing mark, splice out mark, or CCR embedded or otherwise included in the digital video content stream 200. The transition point 245 between the fourth segment 240 and the fifth segment 250 represents a timing mark, splice out mark, or CCR embedded or otherwise included in the digital video content stream 200. The transition point 255 between the fifth segment 250 and the sixth segment 260 represents a timing mark, splice out mark, or CCR embedded or otherwise included in the digital video content stream 200.

Figure 3:
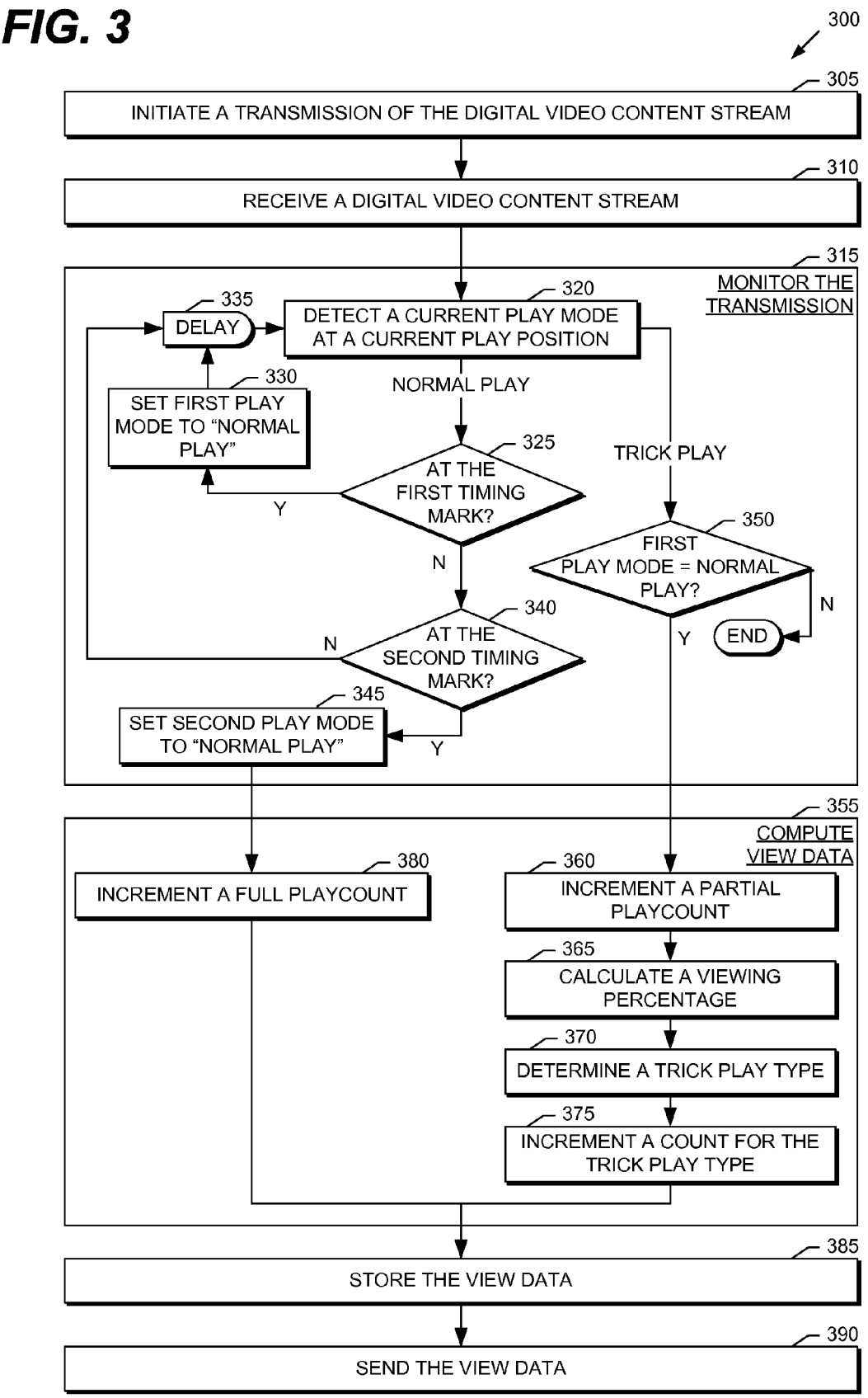
FIG. 3 is a flow diagram that illustrates a method according to one embodiment of the present invention.

FIG. 3 is a flow diagram that illustrates a method according to one embodiment of the present invention. In particular, FIG. 3 illustrates the communication between the head end 110 facility and the set-top box 120.

The process 300 shown in FIG. 3, with reference to FIG. 1 and FIG. 2, begins when the set-top box 120 initiates a transmission of the digital video content stream 200 (step 305). In one embodiment, the initiation of the transmission is responsive to a request from a viewer to play the digital video content stream 200 communicated to the set-top box 120 via the remote controller 170. The set-top box 120 then receives a digital video content stream 200 (step 310). In the embodiment shown in FIG. 2, the digital video content stream 200 comprises a number of video content segments in sequence, including, a first segment 210, a second segment 220, and a third segment 230. In one embodiment, the set-top box 120 receives the digital video content stream 200 from the head end 110 facility as a "live" feed. In another embodiment, the set-top box 120 receives the digital video content stream 200 from a data storage device such as the local data storage device 135.

The set-top box 120 monitors the transmission of the digital video content stream 200 (step 315). The process 300 monitors the transmission to detect a current play mode at a current play position of the transmission (step 320). When the set-top box 120 is operating in normal play mode, the process 300 determines whether the current play position of the transmission is at the first timing mark (step 325). If the current play position is not at the first timing mark (step 325, N branch), the process 300 determines whether the current play position of the transmission is at the second timing mark (step 340). If the current play position is not at the second timing mark (step 340, N branch), the process 300 delays (step 335) a predetermined period of time and continues to detect the current play mode at the current play position of the transmission (step 320). If the current play position is at the first timing mark (step 325, Y branch), the process 300 saves the state of the transmission at the first timing mark as normal play (step 330), then delays (step 335) a predetermined period of time and continues to detect the current play mode at the current play position of the transmission (step 320). If the current play position is at the second timing mark (step 340, Y branch), the process 300 saves the state of the transmission at the second timing mark, then computes the view data (step 355) by incrementing the full playcount (step 380) and stores the full playcount in the view data 164 (step 385).

When the set-top box 120 is operating in trick play mode, the process 300 determines whether the state of the transmission at the first timing mark was saved as normal play (step 350). If the state was not normal play at the first timing mark (step 350, N branch), the process ends. If the state was normal play at the first timing mark (step 350, Y branch), the set-top box 120 increments the partial playcount (step 360), and stores the partial play count in the view data 164 (step 385). The set-top box 120 calculates a viewing percentage (step 365), a percentage of the second segment 220 that was transmitted before the viewer executed the trick play operation, and stores the viewing percentage in the view data 164 (step 385). The set-top box 120 determines a type for the executed trick play operation (step 370), and stores the trick play type in the view data 164 (step 385). The set-top box 120 increments a count of the type for the executed trick play operation (step 375), and stores the count in the view data 164 (step 385).

The set-top box 120 sends the view data 164 (step 390) to another computing device (not shown) that processes the view data 164 to create viewing statistics that are reported to advertisers and other interested third parties. In one embodiment, the sending of the view data 164 is a push operation by the set-top box 120. The set-top box 120 will send unsolicited messages to the other computing device (not shown) on either a periodic, or real-time basis. In another embodiment, the sending of the view data 164 is a pull operation by the other computing device (not shown). The other computing device (not shown) is a trusted device to the set-top box 120 and will query the set-top box 120 on either a periodic, or real-time basis, and pull view data 164 when it is available.

Although the disclosed embodiments describe a fully functioning method and system for collecting, storing, and reporting viewing statistics during playback of video content, the reader should understand that other equivalent embodiments exist. Since numerous modifications and variations will occur to those reviewing this disclosure, the method and system for collecting, storing, and reporting viewing statistics during playback of video content is not limited to the exact construction and operation illustrated and disclosed. Accordingly, this disclosure intends all suitable modifications and equivalents to fall within the scope of the claims.

We claim:

1. A method, comprising:
receiving digital video content streams at a set-top box, each digital video content stream including a first segment of video content, a second segment of video content, a third segment of video content, a first timing mark specifying an end position of the first segment of video content and a start position of the second segment of video content, and a second timing mark specifying an end position of the second segment of video content to a start position of the third segment of video content;
for each video content stream:
initiating a transmission of the digital video content stream at the set-top box;
monitoring the transmission of the digital video content stream relative to the first timing mark and the second timing mark and iteratively determining a current play mode relative to the first timing mark and the second timing mark, the current play mode being one of a normal play mode and a trick play mode;
in response to determining, for a first video content stream, that a current play mode is a normal play mode at the first timing mark and at the second timing mark, incrementing a full playcount;
in response to determining, for a second video content stream, that a current play mode is a normal play mode at the first timing mark and that the current play mode is a trick play mode before the second timing mark, incrementing a partial playcount;
in response to determining, for a third video content stream, that the current play mode is a trick play mode before the first timing mark, not incrementing the full playcount and not incrementing the partial playcount; and
storing data comprising the full playcount and the partial playcount at the set-top box.

2. The method of claim 1, wherein the receiving of the digital video content stream is from at least one of a head end facility, a network, and a local storage location.

3. The method of claim 1, wherein the set-top box includes digital video recorder functionality, and wherein the receiving of the digital video content stream is from the set-top box.

4. The method of claim 1, wherein the first timing mark and the second timing mark are at least one of splice out marks, and change content records.

5. The method of claim 1, wherein the initiating of the transmission further comprises:
receiving a request at the set-top box to transmit the digital video content stream in a normal play mode; and
sending the digital video content stream to a display device in response to the request.

6. The method of claim 1 further comprising computing view data comprising:
the partial playcount, a viewing percentage, a partial playcount.

7. The method of claim 6, further comprising:
sending the view data.

8. The method of claim 7, further comprising:
receiving a request to send the view data.

9. A computing system that includes a set-top box, comprising:
a memory device resident in the set-top box; and
a processor disposed in communication with the memory device, the processor configured to:
receive digital video content streams at a set-top box, each digital video content stream including a first segment of video content, a second segment of video content, a third segment of video content, a first timing mark specifying an end position of the first segment of video content and a start position of the second segment of video content, and a second timing mark specifying an end position of the second segment of video content to a start position of the third segment of video content;
for each video content stream:
initiate a transmission of the digital video content stream at the set-top box;
monitor the transmission of the digital video content stream relative to the first timing mark and the second timing mark and iteratively determining a current play mode relative to the first timing mark and the second timing mark, the current play mode being one of a normal play mode and a trick play mode;
in response to determining, for a first video content stream, that a current play mode is a normal play mode at the first timing mark and at the second timing mark, increment a full playcount;
in response to determining, for a second video content stream, that a current play mode is a normal play mode at the first timing mark and that the current play mode is a trick play mode before the second timing mark, increment a partial playcount;
in response to determining, for a third video content stream, that the current play mode is a trick play mode before the first timing mark, not increment the full playcount and not increment the partial playcount; and
store data comprising the full playcount and the partial playcount at the set-top box.

10. The computing system of claim 9, wherein the receiving of the digital video content stream is from at least one of a head end facility, a network, and a local storage location.

11. The computing system of claim 9, wherein the set-top box includes digital video recorder functionality, and wherein the receiving of the digital video content stream is from the set-top box.

12. The computing system of claim 9, wherein the first timing mark and the second timing mark are at least one of splice out marks, and change content records.

13. The computing system of claim 9, wherein to initiate the transmission, the processor is further comprised to:
receive a request at the set-top box to transmit the digital video content stream in a normal play mode; and
send the digital video content stream to a display device in response to the request.

14. The computing system of claim 9, wherein the processor is further configured to compute view data comprising:
the partial playcount, a viewing percentage, a partial playcount.

15. The computing system of claim 14, wherein the processor is further comprised to:
send the view data.

16. The computing system of claim 15, wherein the processor is further comprised to:
receive a request to send the view data.

17. A non-transitory computer-readable medium, comprising computer-executable instructions that, when executed on a computing device, perform steps of:
receiving digital video content streams at a set-top box, each digital video content stream including a first segment of video content, a second segment of video content, a third segment of video content, a first timing mark specifying an end position of the first segment of video content and a start position of the second segment of video content, and a second timing mark specifying an end position of the second segment of video content to a start position of the third segment of video content;
for each video content stream:
initiating a transmission of the digital video content stream at the set-top box;
monitoring the transmission of the digital video content stream relative to the first timing mark and the second timing mark and iteratively determining a current play mode relative to the first timing mark and the second timing mark, the current play mode being one of a normal play mode and a trick play mode;
in response to determining, for a first video content stream, that a current play mode is a normal play mode at the first timing mark and at the second timing mark, incrementing a full playcount;
in response to determining, for a second video content stream, that a current play mode is a normal play mode at the first timing mark and that the current play mode is a trick play mode before the second timing mark, incrementing a partial playcount;
in response to determining, for a third video content stream, that the current play mode is a trick play mode before the first timing mark, not incrementing the full playcount and not incrementing the partial playcount; and
storing data comprising the full playcount and the partial playcount at the set-top box.

* * * * *